US011996710B2

(12) United States Patent
Ranieri et al.

(10) Patent No.: US 11,996,710 B2
(45) Date of Patent: May 28, 2024

(54) CONTROL SYSTEM FOR DISCHARGING THE CELLS OF A FUEL-CELL STACK

(71) Applicant: Commissariat à l'Energie Atomique et aux Energies Alternatives, Paris (FR)

(72) Inventors: Marco Ranieri, Grenoble (FR); Benoît Morin, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 49 days.

(21) Appl. No.: 17/449,955

(22) Filed: Oct. 5, 2021

(65) Prior Publication Data

US 2022/0109307 A1 Apr. 7, 2022

(30) Foreign Application Priority Data

Oct. 6, 2020 (FR) .................................... 20 10205

(51) Int. Cl.
*H02J 7/00* (2006.01)
*H01M 8/04537* (2016.01)
*H01M 8/04858* (2016.01)

(52) U.S. Cl.
CPC ....... *H02J 7/0013* (2013.01); *H01M 8/04559* (2013.01); *H01M 8/0488* (2013.01); *H02J 7/0047* (2013.01)

(58) Field of Classification Search
CPC .................................................... H02J 7/0016
See application file for complete search history.

(56) References Cited

U.S. PATENT DOCUMENTS 5,742,148 A * 4/1998 Sudo .................... H02J 7/0063 320/155
2004/0101724 A1 5/2004 Imamura et al.
2012/0237800 A1 9/2012 Oriol et al.
2013/0069597 A1* 3/2013 Sugimura ............ H02J 7/0048 320/118

(Continued)

FOREIGN PATENT DOCUMENTS

DE 10 2013 201 995 A1 8/2013
DE 102013201995 A1 * 8/2013 ........ H01M 8/04223
FR 2 951 583 A1 4/2011

OTHER PUBLICATIONS

DE-102013201995 translation , Method for operating fuel cell unit, Wolfsegger (Year: 2013).*

(Continued)

*Primary Examiner* — Drew A Dunn
*Assistant Examiner* — Tynese V Mcdaniel
(74) *Attorney, Agent, or Firm* — Oblon, McClelland, Maier & Neustadt, L.L.P.

(57) ABSTRACT

A control system is intended to be tailored to a fuel-cell stack. This fuel-cell stack includes a plurality of cells connected in series between a first terminal and a second terminal. This system includes a central control unit and an electronic bypass device including a plurality of separate electrical bypass units, each electrical bypass unit being connected in parallel to at least one separate cell of the fuel-cell stack, in order to control its discharge on startup and shutdown of the stack and thus to avoid the creation of inverse electrical potentials and to limit the presence of residual potentials.

12 Claims, 9 Drawing Sheets

(56) References Cited

U.S. PATENT DOCUMENTS

2017/0093185 A1* 3/2017 Eckert .................... H02M 1/32
2021/0336301 A1* 10/2021 Hwang ............... H01M 10/486

OTHER PUBLICATIONS

French Preliminary Search Report dated Jul. 9, 2021 in French Application 20 10205 filed on Oct. 6, 2020, 10 pages (with English Translation of Categories of Cited Documents & Written Opinion).

* cited by examiner

MEA

10a
A
11
C
10b
$H_2$
$O_2$
$H_2O$
$H_2O$

Vp
UC
R12
Cell_3
M5
R3
R6
R13
Cell_2
M4
R2
R5
Cell_1
M3
R1
R4

CONTROL SYSTEM FOR DISCHARGING THE CELLS OF A FUEL-CELL STACK

TECHNICAL FIELD OF THE INVENTION

The present invention relates to a control system intended to be connected to the terminals of a fuel-cell stack, in order to discharge its cells.

PRIOR ART

A fuel-cell stack is a stack of a plurality of cells that are connected in series and/or parallel.

The cells are generators in which electricity is produced by virtue of oxidation on an electrode (anode) of a reducing fuel, dihydrogen for example, coupled with the reduction, on the other electrode (cathode), of an oxidant, such as dioxygen from the air. The reaction of oxidation of the hydrogen is accelerated by a catalyst, which is generally platinum. Although other combinations are possible, the most commonly studied and used stack is the dihydrogen-dioxygen or dihydrogen-air stack (this is notably explained by the abundance of sources of hydrogen on Earth and the ease with which dihydrogen may be produced).

Each cell is composed of a pair of plates, called bipolar plates, and of a membrane inserted between the two plates. The cells are stacked to form a fuel-cell stack of the desired capacity.

The electrical potential of a pair of bipolar plates is typically comprised between 0.6 V and 1.2 V for a stack operating normally.

On startup of the stack, it is known that the flow of hydrogen reaching the cathode is insufficient to deliver the voltage required as output. In the absence of hydrogen to be oxidized, an electric potential of opposite polarity is generated for a short while, which potential may reach −1.2 V, this being accompanied by the appearance of inverse currents, which are then liable to degrade certain components of the stack, notably its electrodes.

A similar problem is observed during shutdown of the stack. All the electrical potentials then tend toward 0 V, but it is regularly observed that residual, positive or negative, potentials persist on certain layers. These residual potentials, which are related to the presence of gas that has not been completely evacuated, are liable to degrade the stack over the medium/long term, for example by oxidizing material(s) (e.g.: the carbon-containing support of the platinum) present on the membrane between two bipolar plates.

These problems have been described in U.S. Pat. No. 7,927,752B2 and solved in this patent via the use of a mechanical device to short-circuit each cell of the stack independently. A solution based on electronic components is also proposed in this document. However, this solution has a plurality of drawbacks, as listed below:

- It does not make it possible to guarantee voltage withstand and good control of the transistors used. The same control voltage is applied to the gates of all the transistors, even though certain thereof are liable to see a voltage difference that may exceed 200 V.
- It does not allow currents to be controlled during the discharge of the cell.
- It requires specific connections to achieve the bypass of each cell of the stack, making the architecture more complex.

More generally, the solution proposed in this prior-art document is not perfect and does not have all the functionalities required to effectively and safely discharge the cells of a fuel-cell stack.

Patent applications FR2951583A1, US2004/101724A1 and DE102013201995A1 each describe a device used to shut down a fuel-cell stack.

The aim of the invention is therefore to provide a control system that is intended to be connected to a fuel-cell stack in order to allow the cells of the stack to be discharged, this system being simple to implement, easy to install, able to provide all the functionalities required for an effective discharge of the cells of a fuel-cell stack and having a perfectly dimensioned architecture.

DISCLOSURE OF THE INVENTION

This aim is achieved via a control system intended to be tailored to a fuel-cell stack, said fuel-cell stack comprising a plurality of cells connected in series between a first terminal and a second terminal, said system comprising:

- a central control unit comprising at least one output, and configured to apply an electrical control potential to said output,
- a first main connection terminal intended to be connected to the first terminal of the fuel-cell stack and to a reference electrical potential, and a second main connection terminal intended to be connected to the second terminal of the fuel-cell stack,
- an electronic bypass device comprising:
  - M separate electrical bypass units, with M higher than or equal to 2, each bypass unit being defined by a rank j, with j ranging from 1 to M, each electrical bypass unit comprising a first connection terminal and a second connection terminal in order to be able to be connected in parallel to at least one separate cell of said fuel-cell stack, and an input control terminal,
  - the second connection terminal of the electrical bypass unit of rank j, for j ranging from 1 to M−1, being connected to the first connection terminal of the electrical bypass unit of rank j+1,
  - the first connection terminal of the electrical bypass unit of rank 1 being connected to the first main connection terminal,
  - the second connection terminal of the electrical bypass unit of rank M being connected to the second main connection terminal,
  - each electrical bypass unit being configured to control a connection or a disconnection between its first connection terminal and its second connection terminal,
- a control circuit comprising a first input terminal connected to the output of the central control unit in order to receive said electrical control potential and a second input terminal connected to the first main connection terminal,
- the control circuit comprising a plurality of output terminals each connected to the input control terminal of a separate electrical bypass unit,
- said control circuit being configured to divide the electrical control potential received as input into a plurality of separate electrical drive potentials, each generated electrical drive potential being intended to be applied to one separate output terminal of the control circuit.

According to one particularity, the control circuit comprises a bridge voltage divider, comprising at least M resistors connected in series, defining therebetween said electrical drive potentials when the electrical control potential is applied to the output of the central control unit.

According to another particularity, each electrical bypass unit comprises a drivable depletion-mode transistor.

According to another particularity, each electrical bypass unit comprises a drivable transistor chosen from:

- a depletion-mode p-channel MOSFET,
- an enhancement-mode n-channel MOSFET,
- a depletion-mode n-channel MOSFET,
- an enhancement-mode p-channel MOSFET.

According to another particularity, each electrical bypass unit comprises a discharging resistor connected to the drain or to the source of its drivable transistor.

According to another particularity, each electrical bypass unit comprises a resistor connected between the gate and source of its drivable transistor.

According to another particularity, the system comprises a pull-down resistor connected between the electrical reference potential and the output of the central control unit or the gate of the transistor of the electrical bypass unit of rank M.

According to another particular feature:

- the central control unit comprises a component for monitoring the voltage across the terminals of each cell of the fuel-cell stack,
- the system comprises two electrical measuring links intended to connect said monitoring component to the terminals of each cell of the fuel-cell stack,
- each electrical bypass unit intended to be associated with a cell of the fuel-cell stack is connected between said two electrical measuring links of the cell.

According to another particularity, the central control unit comprises a control element connected to a drivable output of the monitoring component.

According to another particularity, the control element comprises a first transistor the gate of which is connected to the drivable output of the monitoring component in order to receive a control signal and a second transistor the gate of which is connected to the drain of the first transistor, this second transistor being intended to control the delivery of the electrical control potential.

The invention also relates to an electrical apparatus comprising a fuel-cell stack comprising a plurality of cells, said apparatus comprising a control system such as defined above, each electrical bypass unit of the system being connected in parallel to at least one separate cell of the fuel-cell stack.

According to one particularity, each electrical bypass unit is connected in parallel with the links for measuring voltage across the terminals of each cell of the fuel-cell stack.

It will be seen below that the solution of the invention thus allows the cabling required to measure the voltage across the terminals of the cells of the sack to be merged with the cabling employed to connect each bypass unit of the system. The system may thus be arranged on a simple control board and easily located away from the power portion.

BRIEF DESCRIPTION OF THE FIGURES

Other features and advantages will become apparent in the following detailed description that is provided with reference to the appended drawings, in which.

DETAILED DESCRIPTION OF AT LEAST ONE EMBODIMENT

Figure 1:
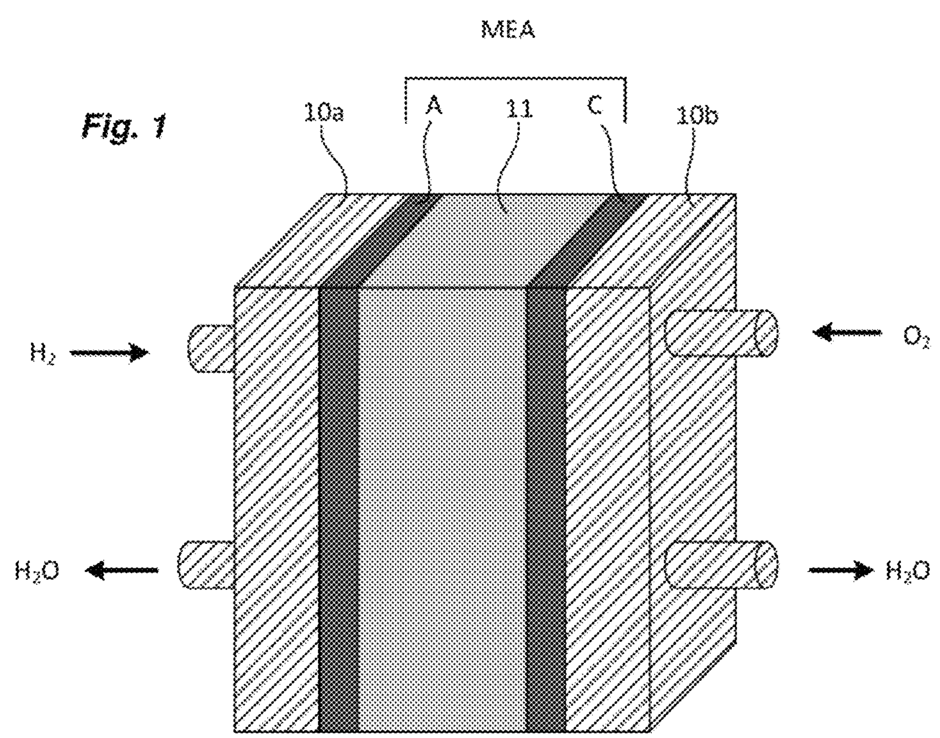
FIG. 1 schematically shows a cell of a fuel-cell stack and illustrates its operating principle.

With reference to FIG. 1, as known, a cell employed in a stacked fuel-cell assembly conventionally comprises:

- bipolar plates (not shown in FIG. 1): The objective thereof is to allow reagents to be routed to the diffusion layers (see below). It is therefore necessary for them to be impermeable in order to avoid any leakage of gases to the exterior and to adjacent compartments. They must also play the role of current collector for the exterior circuit or for the neighbouring cell in the case of a stack of a plurality of cells and allow the heat generated by the reaction to be removed. Lastly, it is also they that hold the cell mechanically. They are, most of the time, manufactured from graphite, composites or metal (stainless steel, aluminium, titanium or nickel).
- the diffusion layers 10*a*, 10*b*: They are given the acronym GDL, for gas diffusion layer. They must meet a number of objectives: they must be permeable to the gases and therefore porous in order to deliver the reagents from the channels to the electrodes, and they also conduct electrons and heat. Generally they are formed from fibres either in paper form or else woven together.
- the membrane-electrode assembly (MEA): This assembly comprises an active first layer called the anode A, which allows dihydrogen ($H_2$) molecules to be dissassociated into electrons and protons. The generated electrons are then drawn into the diffusion layer 10*a* whereas the protons pass through the membrane 11 in order to react with oxygen $O_2$ and other electrons delivered by an exterior circuit. These three elements combine in the second active layer, the cathode C, to form water $H_2O$. Thus, one role of the MEA is to catalyze the chemical reactions that occur at the electrodes and its membrane must be a good ionic conductor. The main materials used in the design of MEAs are firstly sulfonated perfluoro polymers, such as Nafion (registered trademark), which form the thin membrane, the thickness of which ranges from 10 to 100 μm depending on the application. The electrodes are mainly composed of platinum, as regards the catalyst, of carbon, which serves as support for the catalyst, and of a polymer that facilitates protonic percolation within the electrode.

Figure 2:
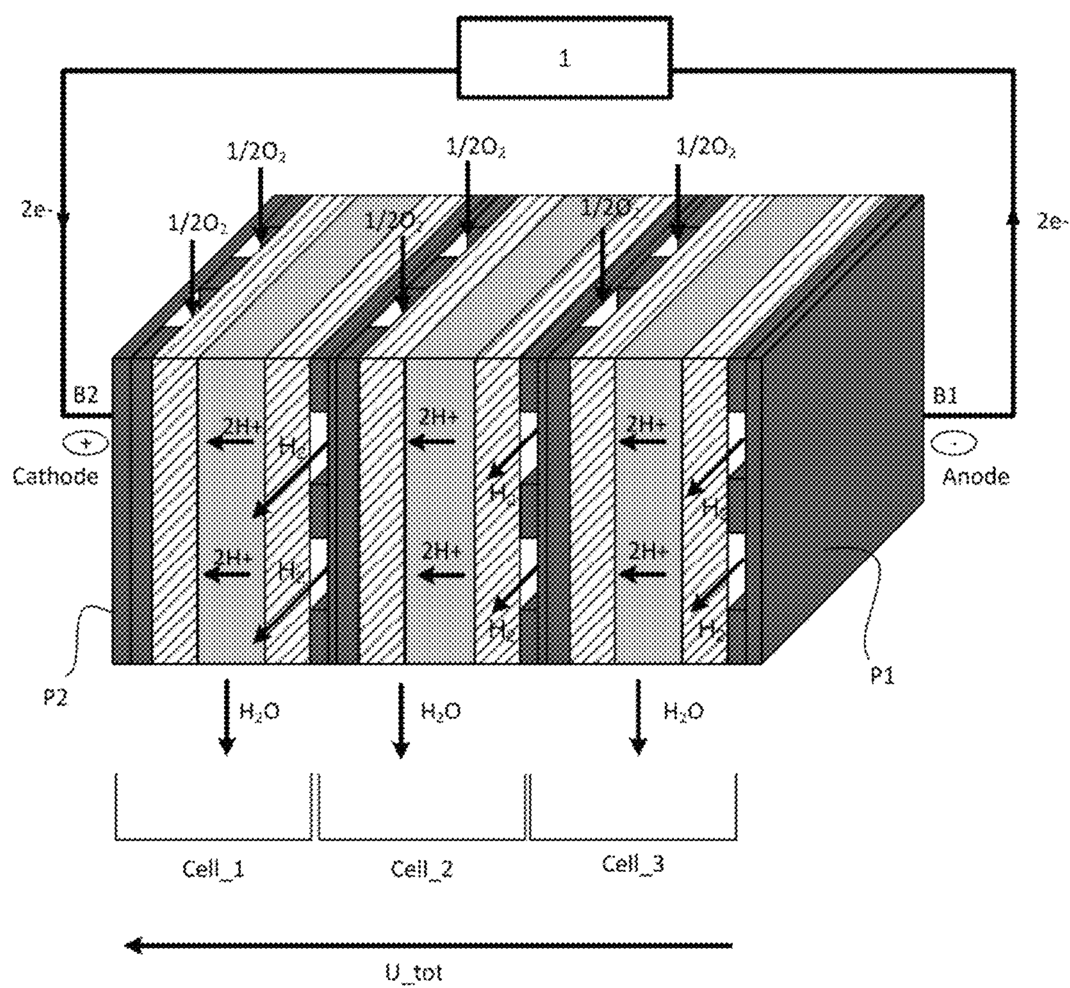
FIG. 2 schematically shows a fuel-cell stack composed of a stack of a plurality of cells such as those of FIG. 1.

FIG. 2 shows a stack of a plurality of cells such as those of FIG. 1, between two bipolar plates P1, P2, forming a fuel-cell stack, which stack is referenced PAC and intended to supply power to an electrical load 1. By way of example, this fuel-cell stack is of the PEMFC type (PEMFC being the acronym of polymer-exchange-membrane fuel cell). It works with hydrogen and converts chemical energy, freed by the reaction between hydrogen ($H_2$) and oxygen ($O_2$), into electrical energy (electrons e-), thus forming water molecules ($H_2O$). The cells are connected in series between a first terminal B1 (its anode) and a second terminal B2 (its cathode). The stack may comprise N cells, with N higher than or equal to 2. Each cell may be referenced with a rank i, with i ranging from 1 to N. In FIG. 2, the fuel-cell stack comprises three cells Cell_1, Cell_2, Cell_3 connected in series.

For such a stack of a plurality of cells, the invention aims to be able to discharge each cell or group of cells of the stack (create a bypass), notably on start-up and on shutdown of the stack, in order to avoid the creation of inverse electrical potentials and to limit the presence of residual potentials.

The invention takes the form of a control system intended to be connected to the fuel-cell stack PAC.

The system notably has the advantage of being able to be integrated directly into an electronic control board, without major modifications, via reuse of components that are already present to monitor the fuel-cell stack PAC.

Figure 3:
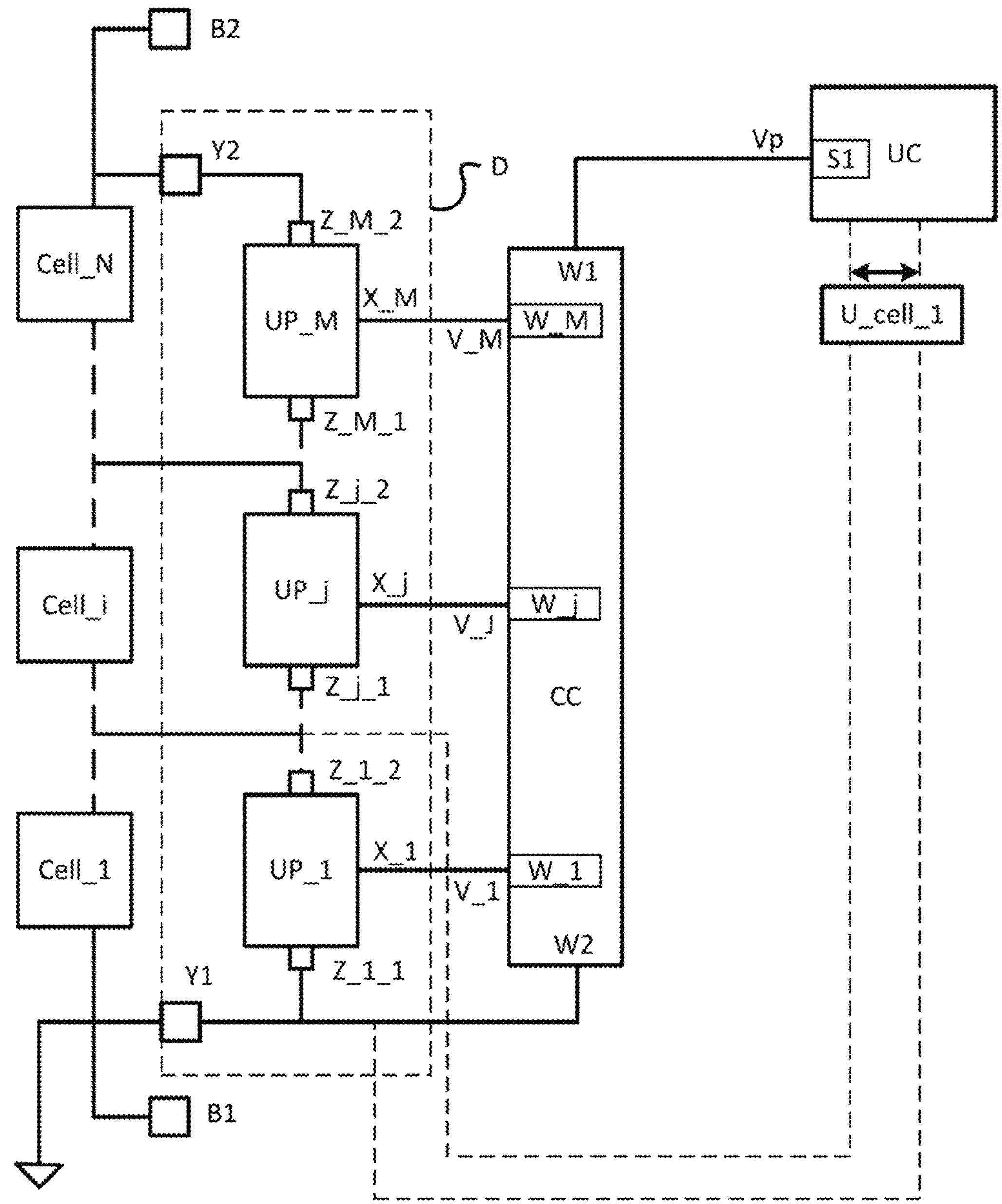
FIG. 3 schematically shows the architecture of the control system of the invention, connected to a fuel-cell stack.

With reference to FIG. 3, this system mainly comprises:

a central control unit UC;

an electronic bypass device D comprising a plurality of electrical bypass units;

a control circuit CC for controlling said electronic bypass device D.

The central control unit UC comprises a control output S1, and is configured to deliver an electrical control potential Vp to this output S1.

Figure 4:
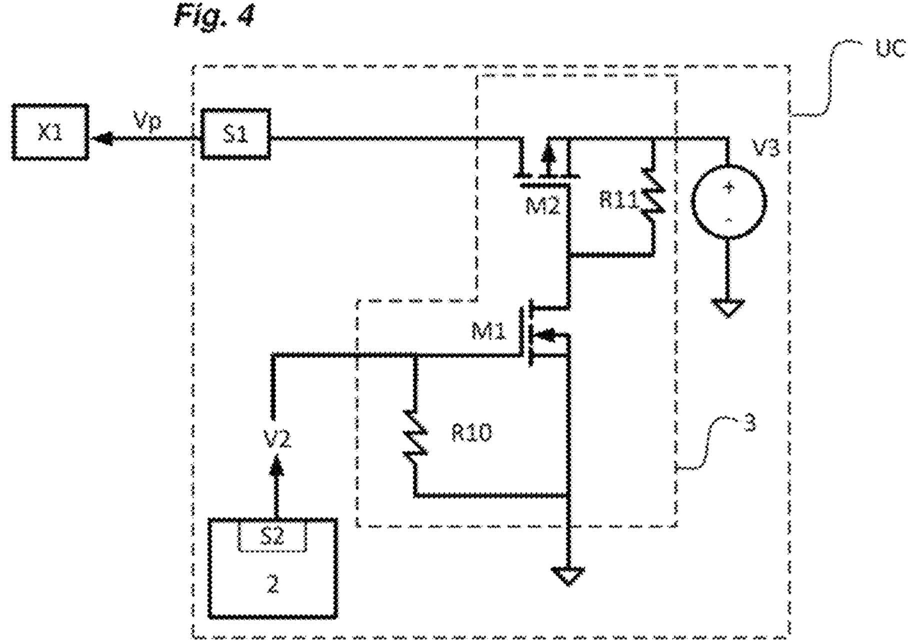
FIG. 4 shows one example of embodiment of the central control unit employed in the system of the invention.

With reference to FIG. 4, nonlimitingly, the central control unit UC may comprise an electronic component 2 for monitoring voltages that are present across the terminals of each cell Cell_i of the fuel-cell stack PAC. This monitoring component 2 may comprise at least one output S2 that is drivable by software. This component 2 may be intended to deliver a control signal V2 with a view to controlling the control output S1 of the central control unit UC.

This monitoring component 2 may be that already present and already used to monitor the fuel-cell stack PAC, and notably to gather the data resulting from measurement of the voltages across the terminals of the cells of the stack. To gather the voltage measurements, two measurement links (electrical wires and/or electrical tracks, etc.) are connected to the terminals of each cell of the stack PAC. The monitoring component 2 thus comprises a plurality of measurement inputs to which are connected the measurement links, with a view to measuring the voltages across the terminals of each cell of the stack.

According to one particular aspect of the invention, the system of the invention is tailored to the configuration of this monitoring component, and notably to the number of drivable outputs available on this component and therefore its controlling capacity.

By way of example, the monitoring component 2 may be the component referenced LTC6806 manufactured by Analog Devices-Linear Technology. This component comprises thirty-six measurement inputs but has only six drivable outputs (called GPIOs, acronym of “general purpose input outputs”), this preventing it from effectively protecting a fuel-cell stack during its start-up/shutdown, and/or notably from discharging all the cells of a fuel-cell stack during this start-up/shutdown. Specifically, without a tailored system, it is not able to drive thirty-six transistors or contactors with only six drivable outputs.

The central control unit UC may comprise a voltage source V3, allowing the control electrical potential Vp to be delivered on command by the monitoring component 2.

The central control unit UC may comprise a control element 3 driven by the monitoring component 2 with a view to controlling the delivery of the electrical control potential Vp delivered by the voltage source V3.

Nonlimitingly, the control element 3 may consist of two transistors, for example:

an n-channel first enhancement-mode transistor M1 the gate of which is connected to the output of the monitoring component 2 in order to receive a control signal V2, and a p-channel second enhancement-mode transistor M2 the gate of which is connected to the drain of the first transistor M1, this second transistor M2 being intended to control the delivery of the electrical control potential Vp.

Resistors R10, R11 are connected between the gate and the source of the transistors M1 and M2, respectively.

The central control unit UC may comprise processing means integrated into the monitoring component 2 or connected to the monitoring component 2 via a communication bus. These processing means are intended to send orders to the monitoring component 2 with a view to driving the control element 3 and thus controlling the delivery of the electrical control potential Vp.

With reference to FIG. 3, this system also comprises:

a first main connection terminal Y1 intended to be connected to the first terminal B1 of the fuel-cell stack PAC and to a reference electrical potential (ground), and a second main connection terminal Y2 intended to be connected to the second terminal B2 of the fuel-cell stack.

As indicated above, the system comprises an electronic bypass device D comprising a plurality of electrical bypass units or discharging units UP_j. A bypass unit UP_j allows a discharge path to be created in parallel to at the least one cell Cell_i of the fuel-cell stack.

Nonlimitingly, an electrical bypass unit UP_j comprises a drivable transistor. It will be seen below that the transistor may adopt various configurations.

The electronic bypass device D may comprise M electrical bypass units, with M higher than or equal to 2. Each bypass unit UP_j may be referenced with a rank j, with j ranging from 1 to M.

It will be noted that the number M of bypass units UP_j is advantageously equal to the number N of cells, this allowing each cell of the stack to be short-circuited separately. However, it will be understood that the number M may be lower than the number N, at least one electrical bypass unit then being intended to short-circuit a plurality of cells of the fuel-cell stack.

Figure 8:
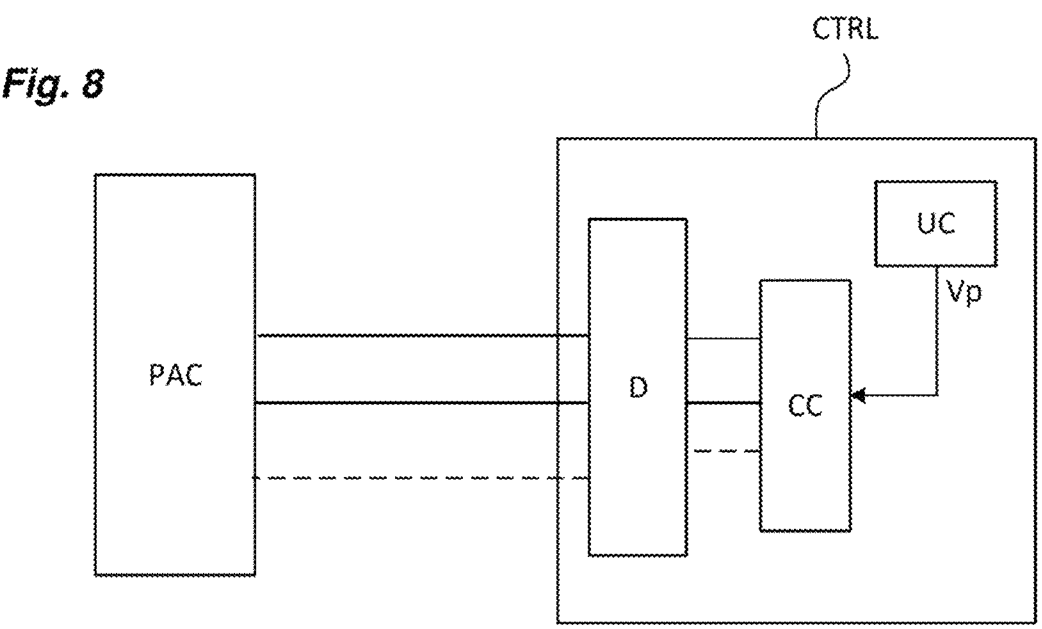
FIG. 8 shows an example of the architecture of an electrical apparatus comprising a fuel-cell stack and the system of the invention.

According to one particular aspect of the invention, each bypass unit UP_j may be directly connected between the two links for measuring voltage: thus, systems that already exist for connecting to the stack for measurement, and which are often tricky to produce from a point of view of footprint and of mechanical strength, are reused. The bypass units may thus be produced directly on the control board of the fuel-cell stack PAC. This control board of the fuel-cell stack may thus be easily located away from the fuel-cell stack and the “control” portion separated from the “power” portion. FIG. 8 illustrates this architecture.

FIG. 3 shows, via dashed lines, for the first cell Cell_1 of the stack, the measurement links that allow the measurement of the voltage U_cell_1 across the terminals of this first cell, and illustrates the connection of its bypass unit UP_1 in parallel with these two measurement links.

It will be noted that the principle of use of the measurement links both to take voltage measurements and to allow the bypass units to be connected may require the phases of operation of the system to be adapted accordingly. It is notably necessary to alternate measuring phases and discharging phases (during the bypass of a cell). The monitoring component may be made to alternate its so-called "control" phases, i.e. phases of control of its inputs/outputs in which it allows current to be discharged through the bypass units, and the so-called "read" phases, i.e. phases of measuring the voltages across the terminals of each cell of the fuel-cell stack. The read phases will last a very short time (a few milliseconds), allowing the phases of operation of the cells of the fuel-cell stack in bypass mode not to be disrupted.

Each electrical bypass unit UP_j comprises an input control terminal X_j. It also comprises a first connection terminal Z_j_1 and a second connection terminal Z_j_2, in order to be connectable in parallel to at least one cell of said fuel-cell stack.

The electronic bypass device D is connected in the following way:

- the second connection terminal Z_j_2 of the electrical bypass unit of rank j, for j ranging from 2 to M−1, is connected to the first connection terminal of the electrical bypass unit of rank j+1,
- the first connection terminal Z_1_1 of the electrical bypass unit of rank 1 is connected to the first main connection terminal Y1,
- the second connection terminal Z_M_2 of the electrical bypass unit of rank M is connected to the second main connection terminal Y2.

The control system comprises a control circuit CC for controlling the electronic bypass device D.

The control circuit CC comprises a first input terminal W1 connected to the control output S1 of the central control unit UC in order to receive said electrical control potential Vp and a second input terminal W2 connected to the first main terminal Y1. It also comprises a plurality of outputs W (with j ranging from 1 to M), that are each connected to one control terminal X_j of a separate bypass unit UP_j.

The control circuit CC is thus configured to divide the electrical control potential Vp received as input into a plurality of separate electrical drive potentials V_j each applied to one separate output terminal.

To do this, the control circuit CC comprises a plurality of separate control units that are connected in cascade, each comprising an output W_j dedicated to the control of one separate electrical bypass unit UP_j, the last control unit of the series receiving as input the electrical control potential Vp from the central control unit UC. The control units may thus be referenced with the rank j, with j ranging from 1 to M. The control unit of rank j receives as input a control potential from the unit of rank j+1 and is configured to deliver a drive potential V_j to its output W_j.

Nonlimitingly, the control circuit CC may take the form of a bridge divider comprising a plurality of resistors in series. To generate an electrical drive potential V_j, for the control units of rank 1 to M−1, each control unit of the control circuit CC thus comprises at least two resistors in series, forming a resistive bridge, the midpoint present between the two resistors in series defining a particular output W_j of the control circuit CC. As regards the control unit of rank M, the last resistor of the bridge divider may be omitted, the electrical control potential Vp being set by the central control unit UC.

The control circuit CC comprises at least M resistors connected in series. The resistors of the bridge divider have a resistance chosen in order to allow the electrical potential received upstream to be divided and each electrical drive potential V_j tailored to the control of the associated bypass unit UP_j to be generated.

Figure 5A:
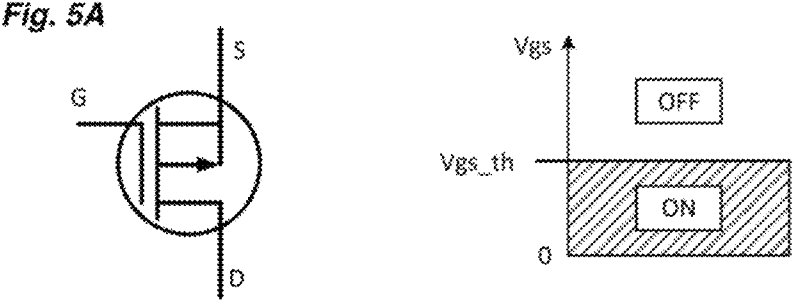
FIGS. 5A, 5B and 5C show three examples of transistors that may be employed in each electrical bypass unit of the system of the invention and illustrates, for each thereof, their operating principle.
Figure 5B:
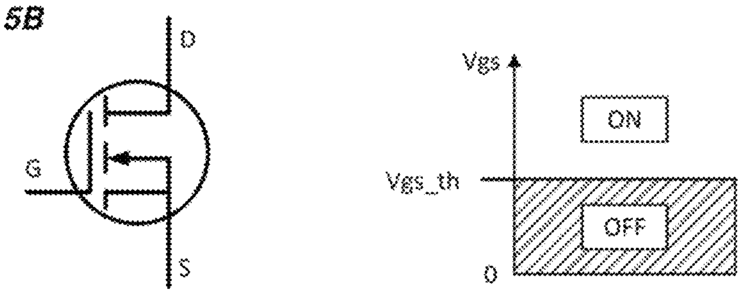
Figure 5C:
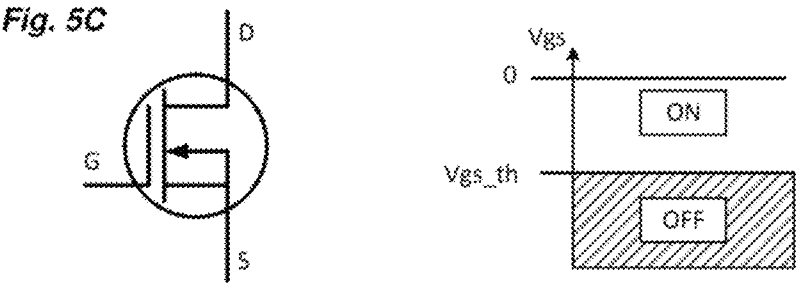

With reference to FIGS. 5A to 5C, each electrical bypass unit UP_j comprises at least one drivable transistor.

The transistor is advantageously a field-effect transistor (FET), and advantageously a MOSFET.

It will be recalled that MOSFETs may be divided into two large families, depending on their type of channel, and into two modes. The channel may be n-type or p-type. The mode may be enhancement or depletion. Enhancement-mode transistors are normally off, i.e. in the absence of a drive voltage between its gate and its source the transistor remains in the off state. Depletion-mode transistors are normally on, i.e. in the absence of a drive voltage between its gate and its source the transistor remains in the on state. The current controlled by the activation of the transistor flows from the drain to the source in n-channel MOSFETs, and flows from the source to the drain in p-channel MOSFETs. In n-channel MOSFETs the parasitic diode is oriented from the source to the drain, and in p-channel MOSFETs the parasitic diode is oriented from the drain to the source.

By way of example, in each bypass unit, the transistor may thus be:

- a depletion-mode p-channel MOSFET, as shown in FIG. 5A, or
- an enhancement-mode n-channel MOSFET, as shown in FIG. 5B, or
- a depletion-mode n-channel MOSFET, as shown in FIG. 5C, or
- an enhancement-mode p-channel MOSFET.

By way of variant embodiment, it is also possible to employ a transistor made of gallium nitride (GaN) or of silicon carbide. These transistors have a number of advantages, among which:

- they have a low on-state resistance, thus allowing a much higher current to be passed than would be possible with a silicon component, while occupying an equivalent or even smaller volume;
- they may easily be made depletion-mode, this as will be seen below being somewhat advantageous with respect to the invention.

With reference to FIG. 5A, a depletion-mode p-channel MOSFET is turned on when the voltage Vgs between its gate and its source is lower than the threshold electrical potential Vgs_th. It is turned off when its gate-source voltage Vgs is higher than said threshold Vgs_th. Its particularity is that, contrary to enhancement-mode transistors, its threshold voltage Vgs_th is positive and non-negative. It is therefore normally on, this meaning that, in the absence of drive signal, the transistor remains in the on state and the application of a suitable voltage Vgs allows it to be turned off.

By way of example, it may be a question of a transistor sold by ON Semiconductor under the reference MMBFJ177LT1, which has a threshold voltage for conduction of Vgs_th=2.5 V.

Figure 6A:
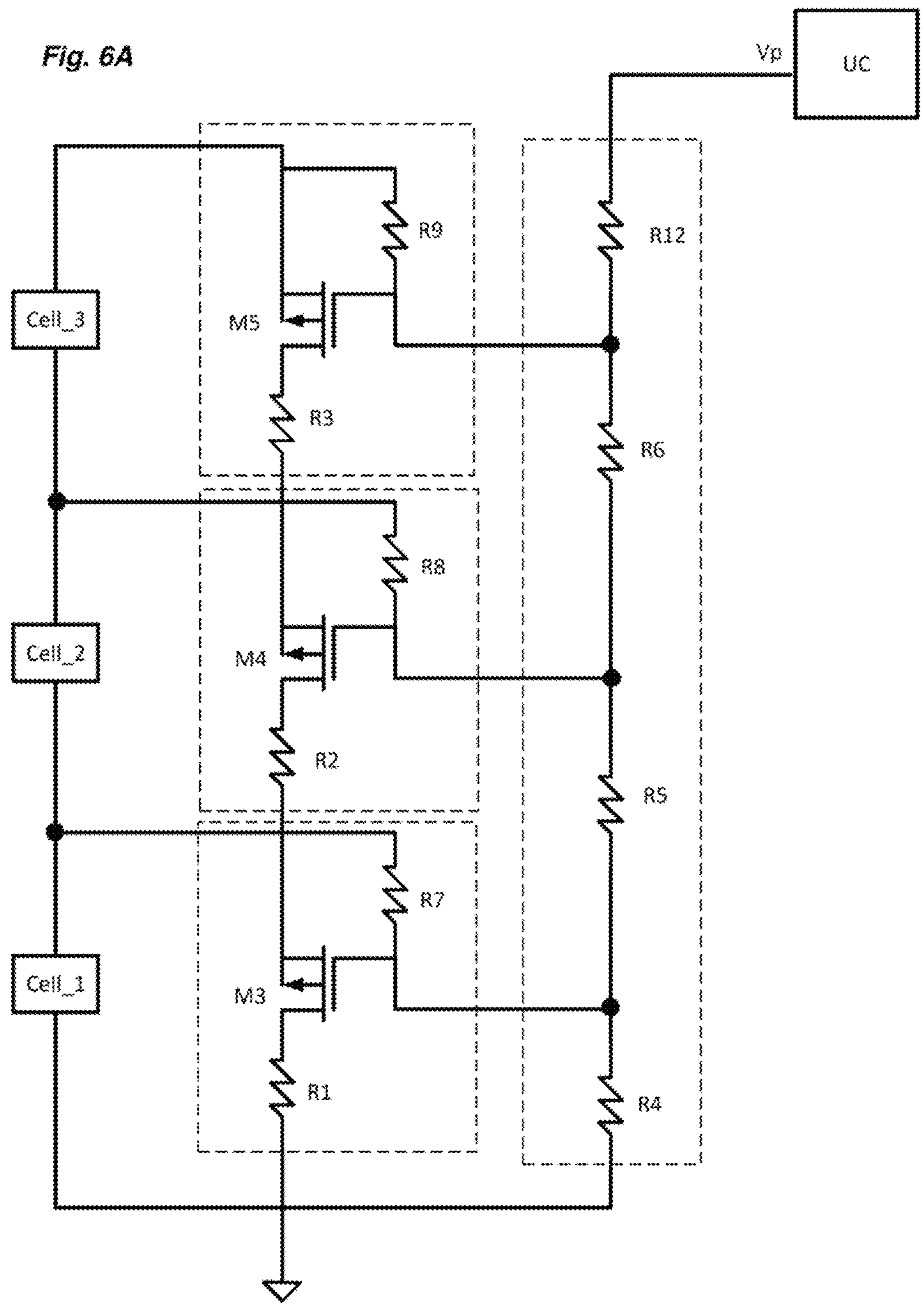
FIGS. 6A, 6B and 6C show three variant embodiments of the control system of the invention.

FIG. 6A shows the system of the invention employing, in each electrical bypass unit, a depletion-mode p-channel MOSFET. The system is shown connected to a fuel-cell stack comprising three cells. If thus comprises three electrical bypass units, each dedicated to discharging a separate cell of the stack.

This schematic thus shows:

M3, M4, M5: depletion-mode p-channel MOSFETs integrated into each electrical bypass unit.

R7, R8, R9: resistors connected between the gate and the source of each transistor M3, M4, M5, respectively.

R1, R2, R3: resistors connected, for each transistor M3, M4, M5, respectively, between the drain and its second connection terminal.

R4, R5, R6, R12: resistors of the control circuit forming a four-resistor bridge voltage divider, in order to tailor the electrical drive potential to each controlled transistor: their resistances must be chosen to meet this objective.

CC: control circuit such as described above.

UC: control unit tasked with delivering the electrical control potential Vp. It may have the architecture described with reference to FIG. 4.

Assuming this architecture, its operating principle is described below.

The Stack is in Operation and in Normal Regime:

Vp is defined to be equal to 5 V and the resistors R4, R5, R6 and R12 are defined to have the following resistances:

R4=8.1 kohms

R5=R6=R12=1.2 kohms

The transistors M3, M4 and M5 are depletion-mode.

In each cell of the fuel-cell stack in operation, a voltage is present, for example a maximum of 1.2 V (this is the case least favourable to the electronics). The source electrode of the transistor M5 is at an electrical potential with respect to ground that is V=3*1.2=3.6 V (because the three cells are in series).

The monitoring component 2 drives its drivable output via software to the high state, allowing the transistor M1 to be controlled to the on state, this also causing the transistor M2 to conduct.

The electrical control potential Vp (for example equal to 5 V) is therefore applied to the control output of the central control unit UC, allowing the control circuit CC to be controlled.

On the basis of the electrical control potential, the control circuit CC generates the electrical drive potentials $V_j$ on each of its outputs $W_j$ (j ranging from 1 to M). The presence of the resistor R12 and of the bridge divider that follows produces a gate-source voltage of the transistor M5 that is equal to $Vgs_{M5}$=4.4 V.

The transistor M5 is therefore in the off state, this preventing the corresponding cell Cell_3 from being short-circuited, as desired in normal operation of the stack.

By virtue of the bridge dividers, the gate-source voltage applied to the transistor of each bypass unit is kept higher than the threshold value $Vgs_{th}$, thus allowing it to be kept in the off state.

It will be noted that the proposed specification is tailored to the case where each cell may deliver a voltage of 1.2 V. If each cell delivers a lower voltage, 0.6 V for example, the gate-source voltage Vgs of the transistor of each electrical bypass unit $UP_j$ will automatically increase, thus allowing it to be controlled to the off state more compellingly.

It will be noted that the bridge divider of the control circuit CC consumes about 1 mA in operation, a value that is negligible with respect to the power of the stack.

The aim of the bridge divider is to correctly turn each transistor M3, M4, M5 off without applying too high an electrical drive potential, in order to avoid any deterioration of components.

On Shutdown of the Stack:

The monitoring component 2 of the central control unit UC drives its drivable output via software to the low state, allowing the transistors M1 and M2, which are pulled down by the resistors R10 and R11, respectively, to be turned off.

The voltage on the gate of each transistor M3, M4, M5 is therefore naturally drawn to the potential of their source electrode, by the action of the resistors R7, R8, R9, causing them to turn on.

All the cells of the fuel-cell stack are thus discharged, removing any residual potential that could damage the membrane or another element of the fuel-cell stack.

It will be noted that, even if the monitoring component 2 no longer delivers any signal on its drivable output, and therefore no electrical control potential Vp is delivered as input to the control circuit CC, all the cells are nonetheless discharged because the shutdown of the fuel-cell stack generates an electrical potential that tends toward 0 V on the source of each of the transistors M3, M4, M5, this potential then being sufficient to drop their gate-source voltage Vgs below the threshold value $Vgs_{th}$ and therefore to turn them on.

This architecture therefore proves to be particularly robust because, in the absence of control, all the cells of the fuel-cell stack are automatically discharged, thus preventing any risk of electrocution.

Figure 6B:
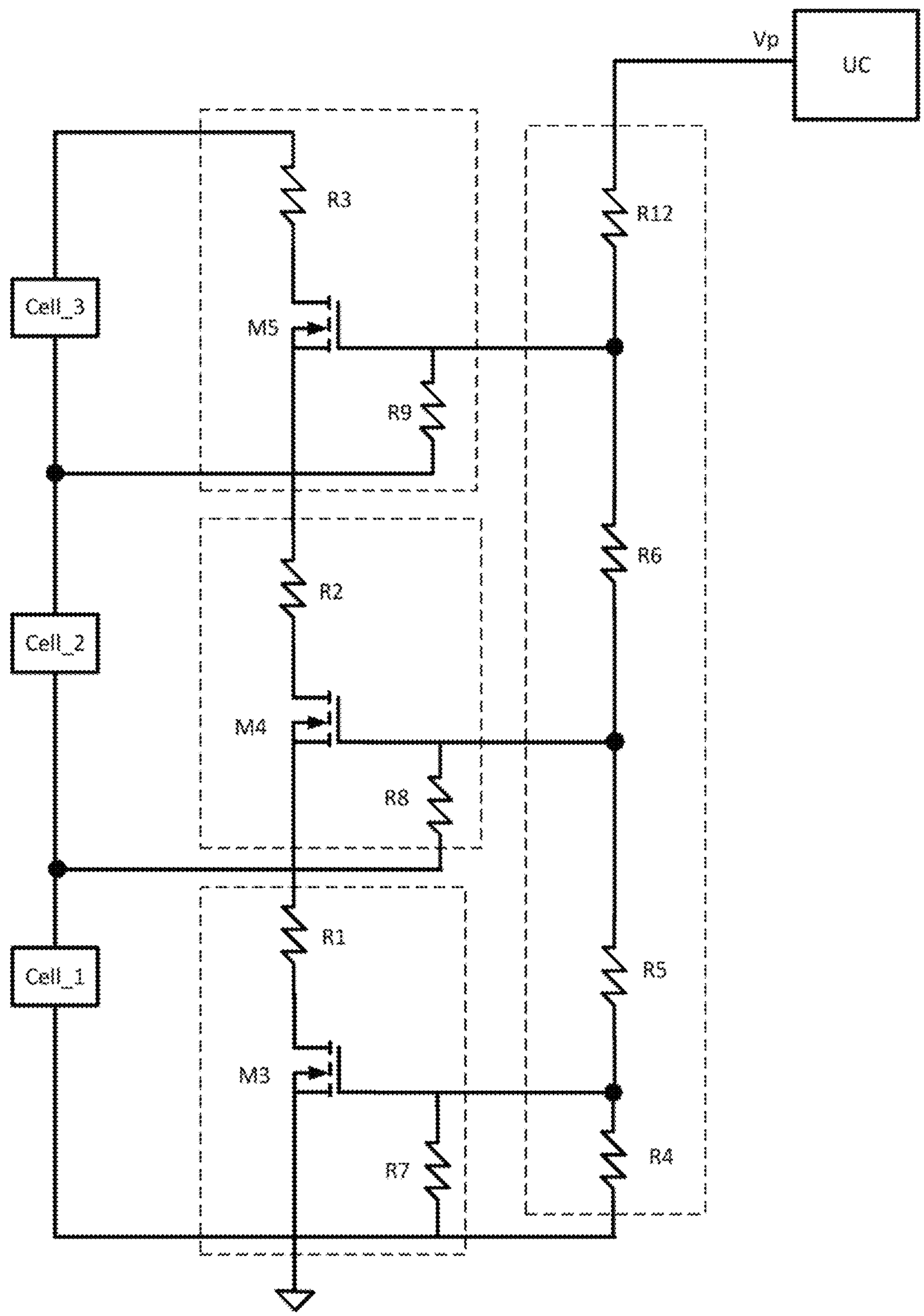
Figure 6C:
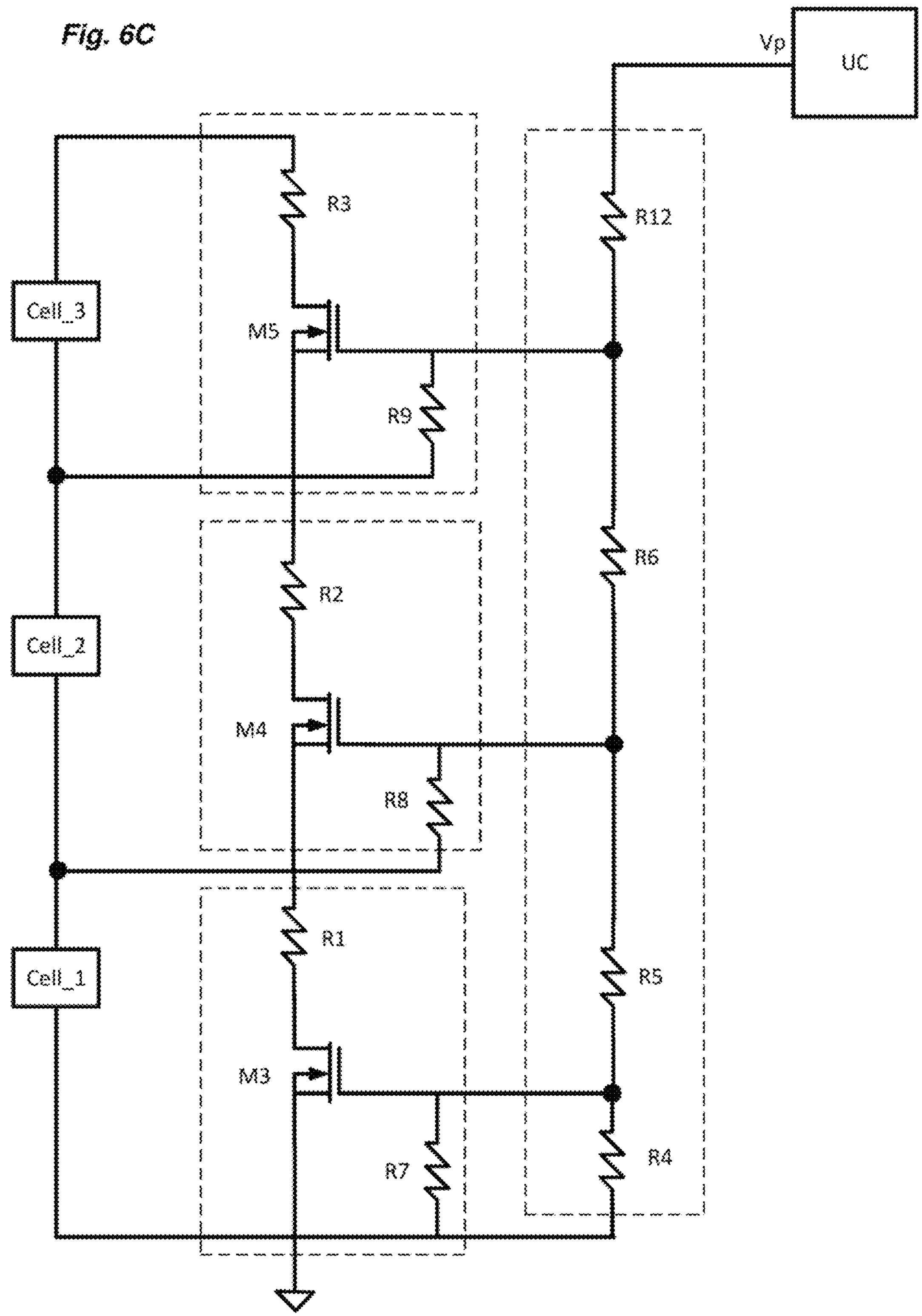

It may be noted that a plurality of current-limiting elements, embodied for example by the resistors R1, R2, R3 in FIGS. 6A, 6B and 6C, are advantageously introduced to regulate the discharge current when the cell $Cell_i$ is discharged. The value of these limiting elements must be set on a case-by-case basis, depending on the size of the fuel-cell stack PAC, the current that it is necessary to pass during the discharge and the time for which this current will be required to flow, in order to dissipate a reasonable power that respects the ability of the system to dissipate heat. By way of example, the resistors R1, R2, R3 may have a resistance of 200 Mohms. Of course, other dissipation solutions may be employed, such as for example positive-temperature-coefficient (PTC) resistors.

FIG. 5B shows an enhancement-mode n-channel MOSFET.

The operation of this transistor is practically the inverse of the operation described above with respect to the p-channel depletion-mode MOSFET.

This transistor is turned off when the voltage Vgs between its gate and its source is lower than the threshold electrical potential $Vgs_{th}$. It is turned on when its gate-source voltage Vgs is higher than said threshold $Vgs_{th}$. It is therefore normally off, this meaning that, in the absence of drive signal, the transistor remains in the off state and the application of a suitable voltage Vgs, higher than the threshold, allows it to be turned on.

FIG. 6B shows the electronic architecture of the system incorporating enhancement-mode n-channel MOSFETs in its bypass units.

In FIG. 6B, the references employed are identical to those used in FIG. 6A.

In this architecture of FIG. 6B, the drivable output of the control component 2 is placed in the low state in normal operation of the stack, so as to turn the transistors M3, M4, M5 off. On shutdown of the stack or on its start-up, this output must be placed in the high state to turn the transistors M3, M4, M5 on and thus discharge the cells of the fuel-cell stack.

With reference to FIG. 5C, a depletion-mode n-channel MOSFET is also normally on just like the transistor shown in FIG. 5A. It is therefore in the on state when the voltage Vgs between its gate and its source is lower than the threshold electrical potential Vgs_th and it is in the off state when its gate-source voltage Vgs is higher than said threshold Vgs_th. Its particularity is that its threshold voltage Vgs_th is negative.

FIG. 6C shows the architecture of the control system of the invention, incorporating transistors according to that of FIG. 5C. Its operation is similar to that described with reference to FIG. 6A. In this architecture, the central control unit UC may have a structure tailored to the negative threshold voltage Vgs_th of the transistors of the electrical bypass units.

It will be noted that it would also be possible to employ an enhancement-mode p-channel MOSFET. The operation of the bypass units would then be similar to that described above with reference to FIG. 6B.

It will also be noted that the resistors R7, R8, R9 described above for the various architectures may be removed and replaced by a single pull-down resistor R13. The resistors R7, R8, R9 have a terminal that is connected to the source of their transistor, and that, when the transistors are not driven but the cells are supplied, is thus at a nonzero voltage. This voltage leads current to pass, between the source of each transistor and ground, and therefore to a nonzero electrical potential on the gates of the transistors. Even though this electrical potential remains too low to turn the corresponding transistor on, it may prove to be advantageous to remove it.

Figure 7:
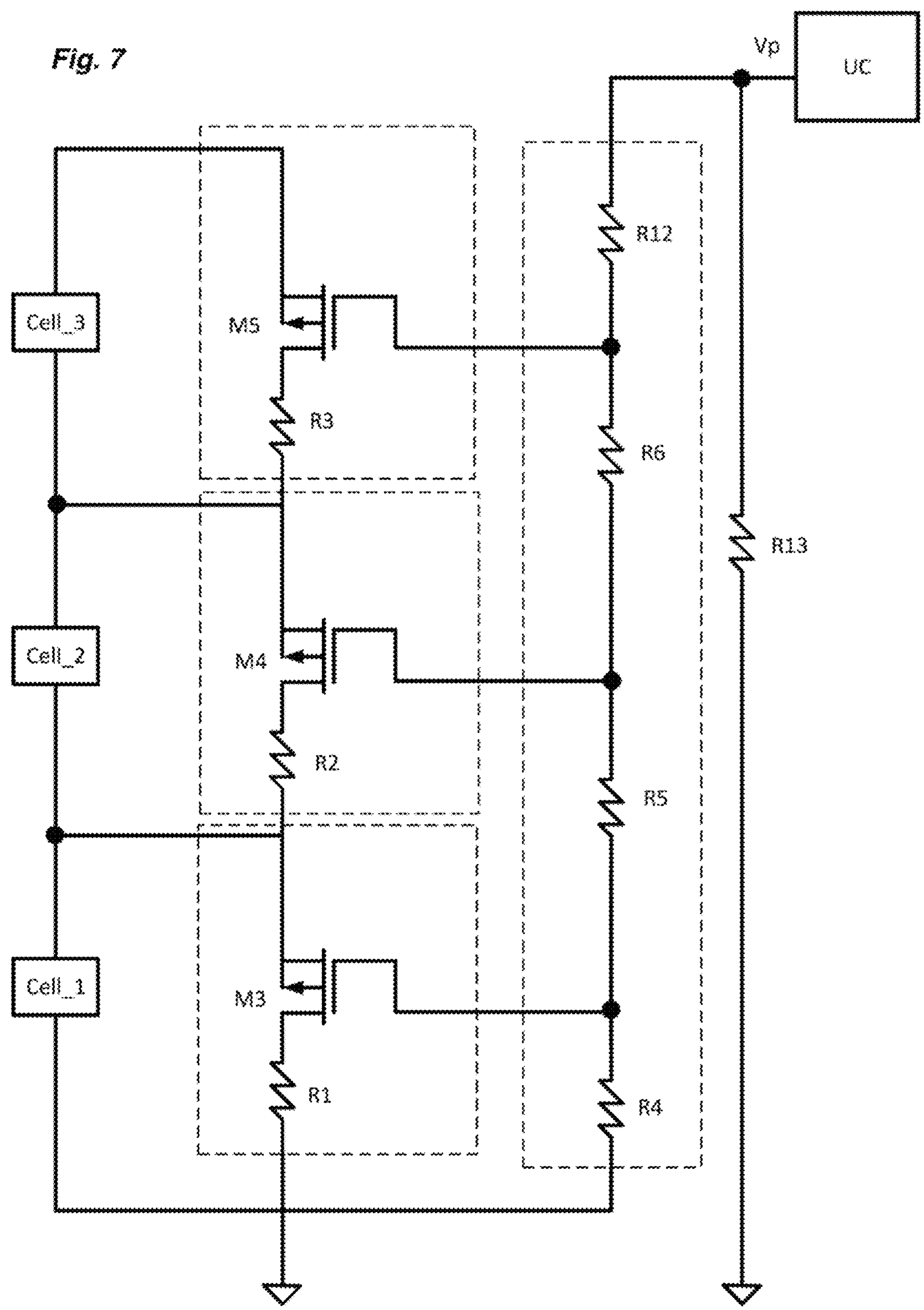
FIG. 7 shows one variant embodiment of the control system of the invention, applied to the architecture of FIG. 6A.

The resistors have therefore been replaced by a single pull-down resistor, referenced R13 in FIG. 7. It allows all the gates of the driven transistors to be grounded, because there is no longer any connection to the sources of the transistors. This resistor R13 may be connected to the reference electrical potential and directly to the output S1 of the central control unit UC or to the gate of the transistor of the bypass unit of rank M. By way of example, this resistor R13 may have a resistance higher than 10 kohms.

With reference to FIG. 8, the control system of the invention may thus be integrated into an electrical apparatus that comprises a fuel-cell stack PAC comprising a plurality of cells, and an electronic portion CTRL for controlling and monitoring the stack, which portion is for example located away from the structure of the fuel-cell stack. This controlling and monitoring portion may comprise the central control unit UC, the control circuit CC and the electronic bypass device D. Ribbon cables allow the fuel-cell stack to be connected to this controlling and monitoring portion. These ribbon cables incorporate measurement wires that are dedicated to measuring the voltages across the terminals of each cell of the fuel-cell stack and that are connected to input/outputs of the monitoring component 2. It will be noted that this controlling and monitoring portion CTRL may itself be connected to a central unit (for example via a communication bus) tasked with managing a plurality of fuel-cell stacks.

Assuming the various architectures described above, the following advantages may thus be listed:

- The solution of the invention makes it possible to guarantee the voltage withstand of the transistors of the bypass units and correct control thereof. The control circuit allows the electrical drive potential to be adjusted and each transistor to be turned on or off, without deteriorating it.
- The solution of the invention allows each transistor to be controlled both ways, i.e. from the on state to the off state and conversely from the off state to the on state. This is permitted by the presence of pull-up or pull-down resistors connected between the gate and source of each transistor.
- The use of depletion-mode transistors allows the operation of the system to be made safer. Specifically, on shutdown or start-up of the stack, this configuration makes it possible to ensure that all the cells have discharged, even in the absence of command from the central control unit.

The solution of the invention allows the cabling required to measure the voltage across the terminals of the cells of the sack to be merged with the cabling employed to connect each bypass unit. The system may thus be arranged on a simple control board and easily located away from the power portion.

The solution of the invention allows the magnitude of the current that passes through each bypass unit during its passage to the on state to be controlled deterministically, in order to dissipate a power compatible with the heat-dissipation capacity of the system, the duration of the start-up/shutdown phases and the actual need to discharge a precise amount of current. This is permitted by virtue of the use of discharge resistors in series with each transistor of the bypass units.

The invention claimed is:

1. A control system configured to be tailored to a fuel-cell stack, said fuel-cell stack comprising a plurality of cells connected in series between a first terminal and a second terminal, said system comprising:

a central control unit comprising at least one output, and configured to apply an electrical control potential to said output, a first main connection terminal configured to be connected to the first terminal of the fuel-cell stack and to a reference electrical potential, and a second main connection terminal intended to be connected to the second terminal of the fuel-cell stack, and an electronic bypass device comprising:

M separate electrical bypass units, with M higher than or equal to 2, each bypass unit being defined by a rank j, with j ranging from 1 to M, each electrical bypass unit comprising a first connection terminal and a second connection terminal in order to be able to be connected in parallel to at least one separate cell of said fuel-cell stack, and an input control terminal, the second connection terminal of the electrical bypass unit of rank j, for j ranging from 1 to M−1, being connected to the first connection terminal of the electrical bypass unit of rank j+1, the first connection terminal of the electrical bypass unit of rank 1 being connected to the first main connection terminal, the second connection terminal of the electrical bypass unit of rank M being connected to the second main connection terminal, and each electrical bypass unit being configured to control a connection or a disconnection between its first connection terminal and its second connection terminal, wherein:

the system comprises a control circuit comprising a first input terminal connected to the output of the central control unit in order to receive said electrical control potential and a second input terminal connected to the first main connection terminal, the control circuit comprising a plurality of output terminals each connected to the input control terminal of a separate electrical bypass unit, and said control circuit being configured to divide the electrical control potential received as input into a plurality of separate electrical drive potentials comprising a plurality of voltage dividing, elements connected in series having one end connected to the first input terminal and another end connected to the first main connection terminal, said control circuit being further configured to apply each generated electrical drive potential of said plurality of separate electrical drive potentials to one separate output terminal of said plurality of output terminals of the control circuit.

2. The system according to claim 1, wherein the control circuit comprises a bridge voltage divider, comprising at least M resistors connected in series, defining therebetween said electrical drive potentials when the electrical control potential is applied to the output of the central control unit.

3. The system according to claim 1, wherein each electrical bypass unit comprises a drivable depletion-mode transistor.

4. The system according to claim 3, wherein each electrical bypass unit comprises a discharging resistor connected to the drain or to the source of its drivable transistor.

5. The system according to claim 3, wherein each electrical bypass unit comprises a resistor connected between the gate and source of its drivable transistor.

6. The system according to claim 3, comprising a pull-down resistor connected between the electrical reference potential and the output of the central control unit or the gate of the transistor of the electrical bypass unit of rank M.

7. The system according to claim 1, wherein each electrical bypass unit comprises a drivable transistor chosen from:

a depletion-mode p-channel MOSFET, an enhancement-mode n-channel MOSFET, a depletion-mode n-channel MOSFET, and an enhancement-mode p-channel MOSFET.

8. The system according to claim 1, wherein:

the central control unit comprises a component for monitoring the voltage across the terminals of each cell of the fuel-cell stack, the system comprises two electrical measuring links intended to connect said monitoring component to the terminals of each cell of the fuel-cell stack, and each electrical bypass unit configured to be associated with a cell of the fuel-cell stack is connected between said two electrical measuring links of the cell.

9. The system according to claim 8, wherein the central control unit comprises a control element connected to a drivable output of the monitoring component.

10. The system according to claim 9, wherein the control element comprises a first transistor the gate of which is connected to the drivable output of the monitoring component in order to receive a control signal and a second transistor the gate of which is connected to the drain of the first transistor, said second transistor being intended to control the delivery of the electrical control potential.

11. An electrical apparatus comprising a fuel-cell stack comprising a plurality of cells, comprising the system according to claim 1, each electrical bypass unit of the system being connected in parallel to at least one separate cell of the fuel-cell stack.

12. The electrical apparatus according to claim 11, wherein each electrical bypass unit is connected in parallel with the links for measuring voltage across the terminals of each cell of the fuel-cell stack.

* * * * *